W. S. LOCKE.
SAW HANDLE.
APPLICATION FILED SEPT. 28, 1909.

962,904.

Patented June 28, 1910.

WITNESSES
Samuel E. Wade
Perry B. Turpin

INVENTOR
WILLIAM S. LOCKE
BY Munn & Co.
ATTORNEYS

UNITED STATES PATENT OFFICE.

WILLIAM SPENCER LOCKE, OF LENTS, OREGON, ASSIGNOR OF ONE-HALF TO PORTLAND REALTY & TRUST COMPANY, OF PORTLAND, OREGON.

SAW-HANDLE.

962,904.  Specification of Letters Patent.  Patented June 28, 1910.

Application filed September 28, 1909. Serial No. 519,948.

*To all whom it may concern:*

Be it known that I, WILLIAM SPENCER LOCKE, a citizen of the United States, and a resident of Lents, in the county of Multnomah and State of Oregon, have made certain new and useful Improvements in Saw-Handles, of which the following is a specification.

This invention is an improvement in saw handles and consists in certain novel constructions and combinations as will be hereinafter described and claimed.

Figure 1:
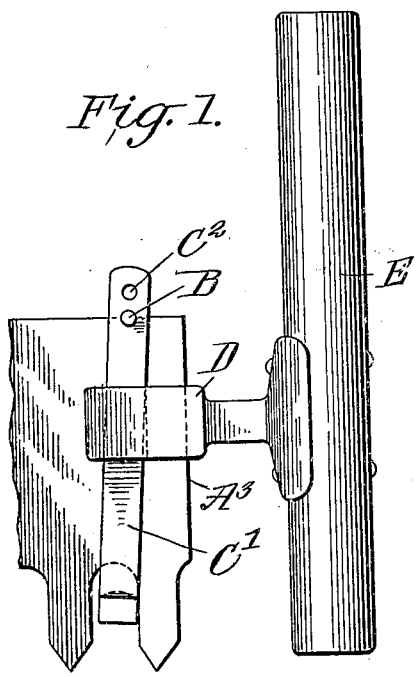
Figure 2:
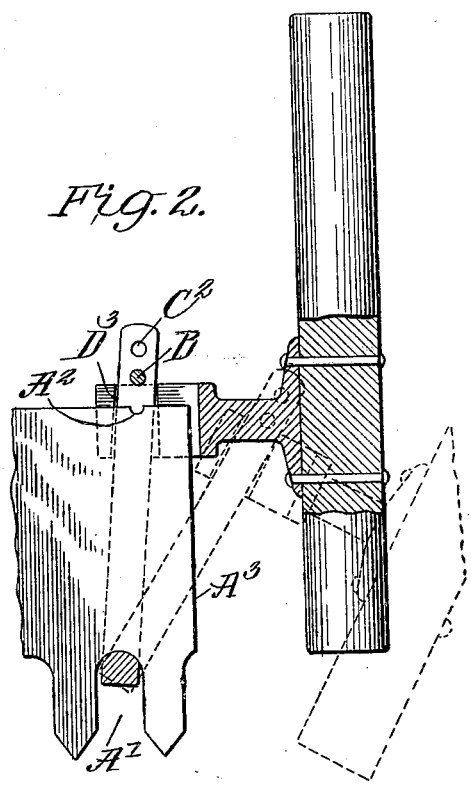
Figure 3:
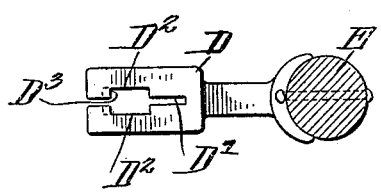
Figure 4:
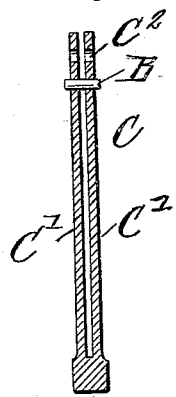

In the drawing Figure 1 is a side view of a handle embodying my invention with the handle applied for use. Fig. 2 is a side view, partly in section, showing the handle and the stirrup in the position assumed in applying the handle to and removing it from the saw blade, dotted lines being employed to indicate another position of the handle. Fig. 3 is a detail view showing the handle shank, the handle being shown in section, and Fig. 4 is a longitudinal section of the stirrup.

The blade A may be that of an ordinary cross cut saw, the notch A' between the first and second teeth forming a seat for the base of the stirrup, and a notch $A^2$ being formed in the upper edge of the blade to receive the pin B which connects the arms C' of the stirrup C above the saw blade and holds the stirrup in place upon the saw blade when the handle is applied for use. When the stirrup is applied as shown in Fig. 1, it forms an inclined surface upon the saw blade for engagement by the shank D of the handle E, so that by my invention I provide a bearing section adapted for application to a saw blade, and a handle having a shank slidable along said bearing section into interlocking connection therewith.

The stirrup arms may have a plurality of openings $C^2$ to receive the pin B, to adapt the stirrup for application to a saw of different widths, and the notches A' and $A^2$ are preferably so disposed that the stirrup when applied as shown in Fig. 1, will extend at an angle to the end edge $A^3$ of the blade. By this construction when the bifurcated shank D of the handle E is applied as shown in Fig. 1, it will bind by a wedging action against the front incline of the stirrup as the handle is pressed downwardly thus affording an interlocking connection between the handle and the saw blade through the aid of the stirrup as shown. The shank D of the handle is bifurcated having a slit D' to fit the saw blade, and recesses or seats $D^2$ therein to receive the arm of the stirrup, the front walls $D^3$ of the recesses $D^2$ being inclined to correspond to the inclination of the stirrup, as will be understood from Figs. 1 and 2 of the drawing.

The shank D may be secured to the handle bar E in any desired manner, and the construction shown affords a simple, economical and conveniently operated device for connecting saw handles detachably to the blades.

As will be understood from dotted lines in Fig. 1, the stirrup will be supported from the shank of the handle and the handle can be conveniently manipulated in applying the stirrup to and removing it from the saw blade, the stirrup forming when applied to the blade a separate bearing section detachable therefrom, and adapted for engagement by the shank of a handle.

I claim:

1. The combination substantially as herein described comprising a saw blade having a notch in its lower edge and provided with a notch in its upper edge, a stirrup having its base bar adapted to be engaged in the notch in the lower edge of the saw and its opposite arms separate and extending up along the opposite side of the saw, a pin connecting the arms of the stirrup and engaging in the top notch of the saw blade, the notches in the upper and lower edges of the blade being so released that the edge of the stirrup arms will be at an angle to the adjacent end edge of the saw blade, and a handle having a shank slitted to receive the saw blade and provided with recesses receiving the stirrup and adapted to engage with the stirrup to interlock the handle with the saw by a sliding movement of the shank along the stirrup, substantially as set forth.

2. The combination of a saw blade and a handle attachment comprising a bearing section applied to the saw blade and inclined relatively to the end of the blade, and a handle having a shank slidable transversely along the saw blade and longitudinally along the bearing section into and out of engagement with the end of the saw blade substantially as set forth.

3. A saw handle attachment having in combination a stirrup adapted for application to a saw blade, and a handle having a shank bifurcated to receive the saw blade with its arms recessed in their inner faces to receive the stirrup, the shank being slidable along the stirrup, substantially as set forth.

4. A handle attachment for saw blades comprising a stirrup having arms to fit on opposite sides of a saw blade, and means adjacent the ends of the arms to engage with the upper and lower edges of a saw blade, whereby it may be suitably positioned on a blade, and a handle shank slidable longitudinally along the stirrup, substantially as set forth.

5. A handle attachment for saw blades comprising a stirrup having spaced apart arms to fit on opposite sides of the saw blade, and a pin connecting the front ends of said arms to engage the edge of a saw blade and extending at its ends for engagement by a handle shank, and a handle shank movable along the stirrup, substantially as set forth.

6. The combination of a saw blade, a stirrup applied thereto, and extending longitudinally in a direction transversely across the saw blade at an angle to the end of the latter, and a bifurcated handle shank slidable longitudinally along the stirrup in a direction transverse the saw blade, substantially as set forth.

7. A handle attachment for saw blades having in combination a stirrup adapted for application to a saw blade, and a handle shank, said stirrup having arms to fit along the opposite sides of the saw blade and said shank being fitted over and slidable longitudinally along the stirrup, substantially as set forth.

WILLIAM SPENCER LOCKE.

Witnesses:
GEO. C. POWERS,
E. G. ALFREDSON.